United States Patent [19]

Howell, Jr.

[11] 4,289,826

[45] Sep. 15, 1981

[54] WATER-BORNE COATING FOR METAL SURFACES

[75] Inventor: John K. Howell, Jr., North Branch, Mich.

[73] Assignee: Hooker Chemicals & Plastics Corp., Madison Heights, Mich.

[21] Appl. No.: 972,305

[22] Filed: Dec. 22, 1978

Related U.S. Application Data

[63] Continuation of Ser. No. 818,184, Jul. 22, 1977, abandoned.

[51] Int. Cl.$^3$ .................. C08L 61/20; C08L 63/00; B05D 3/02; B32B 15/08
[52] U.S. Cl. .................. 428/418; 260/29.2 EP; 260/29.4 R; 427/386; 427/388.3; 427/388.4; 428/460; 525/406; 525/510
[58] Field of Search .................. 427/386, 388.3, 388.4; 260/29.6 NR, 29.2 EP, 29.4 R; 428/418, 460; 525/406, 510

[56] References Cited

U.S. PATENT DOCUMENTS

| | | | |
|---|---|---|---|
| 4,029,620 | 6/1977 | Chen | 260/29.6 NR |
| 4,043,963 | 8/1977 | Anderson | 260/29.4 R |
| 4,059,550 | 11/1977 | Shimp | 260/29.4 R |

*Primary Examiner*—Michael R. Lusignan
*Attorney, Agent, or Firm*—Arthur E. Kluegel; Richard P. Mueller

[57] ABSTRACT

Aqueous compositions are employed to form a protective coating on metal surfaces, in particular, ferrous or tin surfaces, and are especially useful for the coating of blackplate or tin-plated cans. The compositions contain, in the form of an aqueous emulsion, an epoxy resin, an alkylated melamine-formaldehyde resin, an acid catalyst, a block copolymer of ethylene oxide and propylene oxide and water. The composition is applied to a clean metal surface by any conventional technique and even-cured to provide a protective, paint-receptive coating.

8 Claims, No Drawings

WATER-BORNE COATING FOR METAL SURFACES

This is a continuation of Ser. No. 818,184, filed July 22, 1977, now abandoned.

BACKGROUND OF THE INVENTION

This invention relates to the art of applying an organic coating to a metal surface. Specifically, it relates to the application of a water-based organic coating composition to provide corrosion resistance and paint receptivity to a metal surface. Even more specifically, this invention results to a composition and process for imparting an organic coating on a backplate or tinplate can surface.

Present and future markets for metal cans depend primarily upon aluminum, tin-plated steel, and blackplate materials. Methods of can manufacture include three-piece methods wherein a separate top and bottom are combined with a seamed sidewall structure to form the completed can and two-piece methods wherein a unitary sidewall and bottom structure is formed by cold-forming from a metal blank and the top attached thereto to form the completed can. While the particular coating requirements vary depending upon the manufacturing method and/or material, in general, it is necessary to apply a relatively non-porous organic coating to the metal surface in order to:

(1) impart sufficient corrosion resistance to the metal surface;

(2) provide a suitable base for decorative paints and over-varnishes; and (3) provide a suitable barrier between the metal surface and the food, beverage or other contents for which the can is designed.

Environmental considerations have had a substantial impact upon the development of new techniques and compositions for the manufacture of cans. Specifically, conventional processes which employ chromium chemicals and which employ large quantities of volatile organic solvents are environmentally objectionable. Accordingly, it is now desirable to develop compositions and techniques which result in cans of acceptable quality without incurring the environmental penalties inherent in employing chromium and/or volatile organic solvents.

The application of coatings to two-piece cans is particularly critical because of the fact that the coatings must be applied to the unitary bottom and sidewall structure which makes access more difficult. In the two-piece can manufacturing process for tinplate cans, the following steps would be employed for a beverage can:

(1) form unitary sidewall and bottom,
(2) clean with a hexavalent alkaline chromium cleaner,
(3) rinse,
(4) optionally apply wash coat,
(5) dry,
(6) apply outside decorative lacquer,
(7) bake,
(8) apply interior sanitary lacquer,
(9) bake.

In the case of blackplate cans, the procedure would be similar with an optional application of a conversion coating and a rinse following the stage (3) rinse. Further, it is often necessary to apply two layers of sanitary lacquer to avoid undue porosity of the surface coating.

The conventional technique for applying the interior sanitary lacquer to the can is via an airless spray device. This requires that the cans be individually sprayed to obtain a uniform coating. On the other hand, during the cleaning and rinsing stages the cans are not separated for individual treatment. It would therefore be desirable to accomplish the application of the exterior base coat and an interior sanitary lacquered coat via mass treatment of cans with a wash coat in a can washer type of apparatus rather than treating each of the cans individually.

A number of water-borne coatings have been developed in recent years. See, for example, U.S. Pat. Nos. 3,908,049; 3,922,451; 3,968,311; and 3,996,182.

SUMMARY OF THE INVENTION

It has now been discovered that an aqueous composition containing:

(a) an epoxy resin having an average molecular weight of about 900 to 2900 and about 2.7 to 11.6 hydroxy equivalents per mole;

(b) an alkylated melamine-formaldehyde resin in a weight ratio of epoxy resin to melamine-formaldehyde resin of from 2:1 to 20:1;

(c) an acid catalyst in an amount sufficient to effect cross-linking of the epoxy resin and malamine-formaldehyde resin; and (d) a block copolymer of the general formula

having a Hydrophilic-Lipophilic Balance (HLB) in excess of 22 and a molecular weight in the range of about 5000 to 14,000 in an amount of about 2–12 weight % of the total of the epoxy and melamine-formaldehyde resin is suitable for forming an aqueous emulsion and for treating a ferrous or tin surface to form a protective coating thereon when employed at 5 to 85 weight % of components (a) through (d).

DETAILED DESCRIPTION OF THE INVENTION

Aside from water, the four essential components of the composition of the present invention are an epoxy resin, an alkylated melamine-formaldehyde resin, an acid catalyst and a block copolymer of specified formula. The above components form a stable, aqueous phase at a working bath total concentration in the range of from about 5 to 40 wt.%. A concentrate of the composition may be prepared in a total concentration of up to 85 wt.%. In highly concentrated concentrate compositions, it is sometimes desired to include a very small quantity of an ammonium salt of phosphoric acid to enhance stability, e.g., about 0.04 to 0.2 wt.%.

The epoxy resin component of the present invention has an average molecular weight of about 900 to 2900 and about 2.7 to 11.6 hydroxy groups per mole. The preferred epoxy resin has an average molecular weight of about 900 and a hydroxyl equivalent of about 2.7 to 4.2 equivalents per mole. Examples of suitable epoxy resins are the Epon 1001 through 1007 series of resins which are more fully identified in Table IA.

The alkylated melamine-formaldehyde resin employable in the present invention may be any such resin known in the art to be an amino cross-linking agent. Such materials will generally have an equivalent weight in the range of from 130 to 240 in accordance with manufacturer's specifications. The melamine-formaldehyde resin is alkylated with one or more alcohols having from 1-4 carbon atoms so as to produce a corresponding alkylated melamine-formaldehyde resin. The concentration of the alkylated melamine-formaldehyde resin in the composition is selected so as to give a weight ratio of epoxy resin:melamineformaldehyde resin of from 2:1 to 20:1. Examples of suitable alkylated melamine-formaldehyde resins are Cymel 303, Cymel 1130 and Cymel 1156. (See Table IA for further definition.)

The block copolymer, which is the third essential component in the composition, is a block copolymer containing two polyoxyethylene segments separated by a polyoxypropylene segment. The block copolymer thus has the following general formula:

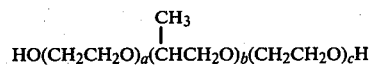

the values for a, b and c are selected to as to give a molecular weight range of from about 5000 to 14,000 and so as to give a Hydrophilic Lipophilic Balance (HLB) in excess of 22. The procedure for determing HLB values is described in *J.Am. Oil Chem. Soc.* 41, 169 (1964), *J. Soc. Cos. Chem.* 1, 311–26 (1949) and *J. Soc. Cos. Chem.* 5,245-55 (1954). Examples of suitable block copolymers are those of the Pluronic series (see Table IA for more detail) and specifically include F-38, F-68 and F-108 designations of the Pluronic series. The preferred block copolymer is that contained in Pluronic F-68 which has an HLB value of about 29 and, in the above formula, a value of $b=30$ and $a+c=150$. The concentration of the block copolymer to be included in the composition should be in the range of from 2 to 12 wt.% of the total concentration of the epoxy and melamine-formaldehyde resin employed.

The fourth essential component of the composition is an acid catalyst which is present in an amount sufficient to effect cross-linking of the epoxy and melamine-formaldehyde resins upon heat curing. The catalyst may be any acid catalyst known to accelerate curing of amino resins with polymers containing hydroxyl, carboxyl or amine functionalities including mineral acids, p-toluene sulfonic acid, dodecylbenzene sulphonic acid, phosphoric acid, alkyl phosphoric acid, maleic acid, trimellitic acid, phthalic acid, and acrylic acid containing polymers. Typically, the concentration of such catalysts ranges from 0.2 to 1.5% by weight of the other non-voltatile components of the composition. Higher percentages, however, may be employed in the case of very high molecular weight catalytic agents. One catalyst useful in the invention is an alkyl or alkylaryl polyoxyethylene sulfate salt of ammonium. The formula for the anion of such a compound is set forth as follows:

R in the formula is an alkyl or alkylaryl group of at least 10 carbon atoms which contains a saturated alkyl portion and m is in the range of from about 4 to 30. Preferably the R is a phenyl group containing a propylene trimer. Examples of suitable compounds are the Alipal EP 110, EP 115 and EP 120 products identified more fully in Table IA. The use of the Alipal compounds has a second advantage in that they also operate to assist in emulsifying the aqueous composition.

The source of water in manufacturing the composition may be tap water; however, deionized or distilled water is preferred because the presence of unknown and unquantified ions which may interfere with the coating quality are thereby eliminated.

In addition to the essential components of the composition, a number of other adjuvants may be employed. Among these are agents for adjusting viscosity and flow characteristics such as hydroxymethyl cellulose, hydroxyethyl cellulose, hydroxypropyl cellulose, water soluble glycol ethers and alcohols; benzoic acid to inhibit rusting of the metal surface on drying; ammonium salts of phosphoric acids for purposes of imparting phase stability and/or pH adjustment; conventional pH adjusters including the commonly-used organic and inorganic acids and bases such as tannic acid, citric acid and tartaric acid; additional emulsifiers and slip agents (surface lubricants); defoaming agents; and organic solvents which aid in emulsification such as cyclohexanone, toluene, MEK, MIBK, MIAK, and the like.

While flooding is the preferred method of application in the case of the treatment of metal cans, other conventional techniques such as spray, immersion and roll-coating may be employed where appropriate for the surface being treated.

Curing is typically preformed at temperatures in excess of 300° F. At 450° F. cure can be effected in about 2½ minutes.

In the case of treating blackplate steel cans, an unexpected advantage was found in addition to the improvements in corrosion resistance and adhesion. Specifically, blackplate cans do not move as readily through a can processing line as do tinplate cans because the tin surface tends to reduce the friction between the can surface and the processing equipment. Blackplate cans tend to encounter undue friction when moving through can processing equipment and therefore cause a significant number of line disturbances. This difficulty is overcome by the composition of the present invention in that additional lubricity is provided to the blackplate surface thereby enabling smoother operation of the can processing line.

In the following examples, reference is made to the Adhesion Test. In this test, a metal can, coupon, or panel, coated with an organic coating, is immersed in a boiling 1% solution of Joy-brand dish detergent for ½ hour. Upon withdrawal from the solution, the test piece is rinsed well with running tap water, scribed down to the metal in a crosshatch pattern, blown dry with compressed air, and then the crosshatch area is firmly taped with Scotch tape. The tape is quickly peeled from the metal surface and the crosshatch area inspected. The test piece is then rated and classified into three categories: no adhesion failure; minor adhesion failure (still acceptable), or major adhesion failure (not acceptable). In the examples, comparative numerical ratings are sometimes used. The rating "10" would correspond to no adhesion failure, ratings "6" to "9" would correspond to minor, but still acceptable adhesion failures (less than 10% removal) and "0" to "5" would correspond to major adhesion failures (in excess of 10% removal).

EXAMPLE 1

A series of emulsions was prepared in accordance with Table IA:

TABLE IA

| Formulation | CONCENTRATION WT. % | | | | | |
|---|---|---|---|---|---|---|
| Component | 1A | 1B | 1C | 1D | 1E | 1F |
| Epon 1001 solution[1] | 21.50 | → | → | 19.83 | → | → |
| Cymel 303[2] | 2.48 | → | → | 3.73 | → | → |
| Pluronic F68[3] | 1.20 | 2.40 | 3.60 | 1.18 | 2.36 | 3.55 |
| Alipal EP-120[4] | 3.60 | 2.40 | 1.20 | 3.55 | 2.36 | 1.18 |
| Mono-ammonium Phosphate | .04 | → | → | → | → | → |
| Deionized Water | Balance | → | → | → | → | → |

[1]Epoxy resin supplied by Shell Chemical Co and employed as 75 wt. % solution in cyclohexanone. Molecular wt. = 900. Hydroxyl groups per mole = 2.7.
[2]Monomeric methylated methylalmelamine resin supplied by American Cyanamid having equivalent weight in the range of 130–190.
[3]Block polymer supplied by BASF Wyandotte containing one oxypropylene segment and 2 oxyethylene segments with about 30 moles oxypropylene and 150 moles oxyethylene per molecule and a molecular weight of about 8350 and an HLB of about 29.
[4]Compound supplied by GAF Corp. containing 30 wt. % in water of ammonium salt of sulfated alkylphenoxypoly(ethyleneoxy) ethanols containing a nonyl phenol-condensed ethylene oxide chain having 30 ethylene oxide groups.

Blackplate ferrous metal coupons, approximately 2"×4", were cut from the sidewalls of precleaned drawn and ironed cans. Pairs of coupons were processed through the emulsions as noted above. The exact processing sequence was: 45 seconds, mild alkali cleaner spray, 15 second warm water rinse spray/15 second deionized water rinse spray/15 second immersion emulsion treatment/5 minute at 400° F. circulating oven bake. In the same manner, approximately 2"×4" tinplate coupons were cut from drawn and ironed tin plate cans, and pairs were processed through the same emulsions using one of three cleaners:

Cleaner A, a milding etching, low alkali (pH 10), chromium-free cleaner used for the blackplate and tinplate coupons noted above); Cleaner B, a low alkali (pH 10), chromium-free cleaner containing tannins to improve cleaning and reduce etch; and Cleaner C, a high alkali (pH 12), chromium containing, non-etching cleaner. The processing sequence was the same as noted above for Cleaner A and Cleaner B cleaned coupons, but those coupons cleaned with Cleaner C were cleaned for 2 minutes instead of 45 seconds. The other steps and times remained the same. After processing, the appearances of the coupons were noted and then one coupon of each pair was subjected to the Adhesion Test. The results are shown in Tables IB, IC and ID.

TABLE IB

| | Tinplate, Cleaners A & B | | ADHESION TEST | |
|---|---|---|---|---|
| Formulation | Cleaner | Appearance | Exterior | Interior |
| 1A | A | D9 blisters | 0 | 0 |
| 1B | A | VF9 blisters | 4 | 6 |
| 1C | A | VF9 blisters | 10 | 10 |
| 1C | B | VF9 blisters | 10 | 10 |
| 1D | A | F9 blisters | 2 | 9 |
| 1E | A | VF9 blisters | 5 | 10 |
| 1F | A | VF9 blisters | 10 | 10 |
| 1F | B | VF9 blisters | 10 | 10 |

TABLE 1C

| | TINPLATE, Cleaner C | | |
|---|---|---|---|
| | | ADHESION TEST | |
| Formulation | Appearance | Exterior | Interior |
| 1A | D9 blisters | 10 | 9 |
| 1B | F9 blisters | 10 | 10 |
| 1C | VF9 blisters | 10 | 10 |
| 1D | VF9 blisters | 10 | 10 |
| 1E | FM9 blisters | 10 | 10 |
| 1F | VF9 blisters | 10 | 10 |

TABLE ID

| | BLACKPLATE, Cleaner A | | |
|---|---|---|---|
| | | ADHESION TEST | |
| Formulation | Appearance | Exterior | Interior |
| 1A | D9 blisters | 0 | 0 |
| 1B | VF9 blisters | 10 | 10 |
| 1C | VF9 blisters | 10 | 10 |
| 1D | F9 blisters | 9 | 9 |
| 1E | F9 blisters | 8 | 10 |
| 1F | M9 blisters | 10 | 9 |

With the exception of Formulation 1A, the results are generally acceptable to excellent. Poor quality for formulation 1A is attributable to excess catalyst concentrations in the form of the Alipal EP-120 which interferes with proper curing.

Similar results were obtained when Epon 1007 having an average molecular weight of 2900 and a hydroxyl equivalent per mole of 11.6 was partially substituted for the Epon 1001; and when butylated or combination methylated-butylated melamine-formaldehyde resins were employed in place of Cymel 303.

EXAMPLE 2

Another series of emulsions was prepared in accordance with Table IIA:

TABLE IIA

| | Concentration Wt. % | | |
|---|---|---|---|
| Formulation | 2A | 2B | 2C |
| Component | | | |
| EPON 1001 | 19.83 | → | → |
| Cymel 303 | 3.73 | → | → |
| Pluronic F68 | 3.78 | 4.25 | — |
| Pluronic F68LF[5] | — | — | 3.55 |
| Alipal EP-120 | .95 | .48 | 1.18 |
| Mono-ammonium phosphate | .04 | .04 | .04 |
| Deionized Water | Balance | → | → |

[5]The same block polymer employed in Example 1 but containing a low foam constituent.

In a manner similar to Example 1, blackplate coupons (one per variation) and tinplate coupouns (two per variation) were processed through these emulsions using the sequence: 45 second Cleaner A spray; 15 seconds warm water spray rinse; 15 seconds deionized water spray rinse; 15 seconds immersion emulsion treatment; 5 minute at 400° F. bake. The coupons were subjected to the Adhesion Test and the results are shown in Tables IIB and IIC.

| | II. B. Tinplate, Cleaner A | | |
|---|---|---|---|
| | | ADHESION TEST | |
| Formulation | Appearance | Exterior | Interior |
| 2A | FM9 blisters | 8 | 9 |
| 2B | VF9 blisters | 10 | 10 |

-continued

II. B. Tinplate, Cleaner A

| Formulation | Appearance | ADHESION TEST | |
|---|---|---|---|
| | | Exterior | Interior |
| 2C | 10 | 9 | 9 |

II.C. Blackplate, Cleaner A

| Formulation | Appearance | ADHESION TEST | |
|---|---|---|---|
| | | Exterior | Interior |
| 2A | FM9 blisters | 8 | 9 |
| 2B | F9 blisters | 8 | 10 |
| 2C | 10 | 6–7 | 9 |

Acceptable to excellent results are observed with those emulsions containing either Pluronic F68 or Pluronic F68LF.

EXAMPLE 3

An emulsion concentrate was prepared to contain the components indicated in Table III:

TABLE III

| Component | Weight Percent |
|---|---|
| Epon 1001 solution | 14.81 |
| Cymel 303 | 2.78 |
| Pluronic F68LF | 2.65 |
| Alipal EP-120 | .88 |
| Mono-ammonium phosphate | .04 |
| Deionized water total | Balance |

A 5 gallon laboratory machine was employed to flood coat a cleaned can.

Twelve drawn and ironed tinplate beverage cans size 2 9/16"×4 3/16" were treated using the sequence: 45 second, Cleaner A spray/15 second warm water spray rinse/15 second dionized water spray rinse/10 second emulsion treatment via flooding on each of the internal and external can surfaces, 30 second drain/3 minute circulating oven at a temperature of 500° F.

Following the procedures described in FDA regulations at 21 CFR 175.300, part (c), for food types identified as I and IV B, eight of the cans were subjected to extraction tests. In brief, the extraction test consisted of spray rinsing the coated cans with hot (190° F.) dionized water (4.9 micromhos) for one minute, filling the cans with distilled water to within ¼" of the top, covering each can with a piece of aluminum foil, placing the cans on a rack in a 21 quart pressure canner containing a small amount of distilled water and heating the pressure canner at 15 p.s.i. (250° F.), for two hours from the time the pressure reaches 15 p.s.i. After cooling, the water samples from inside the cans were transferred to clean Pyrex flasks, evaporated, and the weight of the residue representing the extracted non-volatiles was determined. The average result in mgm extractives/can was 3.06 which corresponds to 0.08 mg/in$^2$ or an "extractive residue" of 8.08 ppm. The maximum values allowed by the regulations are 0.5 mg/in$^2$ and 50 ppm, respectively, if the coating was composed of prior approved components.

EXAMPLE 4

Three dozen tinplate cans, size 2 11/16"×4 13/16", were processed as follows (12 per emulsion variation): dilute soap prewash/warm water rinse/1 minute cleaner C/20 second warm water spray rinse/10 second deionized spray rinse/transfer from can rack to truncated wooden cone/10–15 second emulsion 4A, 4B, or 4C/5 minute cure at 450° F. These particular cans were immersed in the coating emulsions so as not to let any coating material get on the inside portion of the container. Six other cans (two per variation) were similarly treated except that they were coated inside and out and were cured for 2.5 minutes at 450° F. Each can had been cleaned, rinsed, and weighed so that coating weight (mgm per can) could be determined by reweighing the coated container. The formulations are set forth in Table IVA:

TABLE IVA

| Material | Concentration - parts per thousand | | |
|---|---|---|---|
| | 4A | 4B | 4C |
| Epon 1001 solution | 124.9 | 89.2 | 95.6 |
| Cymel 303 | 20.8 | 22.3 | 15.9 |
| Pluronic F68 Flake | 8.4 | 4.3 | 6.4 |
| Alipal EP-120 | 9.4 | 14.2 | 7.2 |
| Natusol 250HR* | — | 1.0 | — |
| Mono-ammonium phosphate | .03 | .04 | .04 |
| Benzoic acid | .02 | → | → |
| Deionized water | Balance | → | → |
| pH | 5.8 | 5.4 | 4.8 |

*Hydroxyethyl cellulose viscosity modifier supplied by Hercules, Inc.

The average coating weight (inside and outside) found was (average of 2 determinations): 4A, 155 mgm/can; 4B, 140 mgm/can; 4C, 110 mgm/can.

35 of the 36 outside only coated cans were marked on the inside can top with a black marking pen so that they could be picked out from regular production cans. At a can manufacturing plant, the cans were inserted into the trackwork ahead of a commercial printer as space or slight slow-ups occurred and so were well mixed with regular production. The cans were printed with a 3 color beer can label (white, dark red, and blue) and overvarnished, baked, given two inside sanitary lacquer coatings of about 110 mgm per pass and baked. The cans, after final baking, were separated from regular production and removed from the line. All 35 were recovered.

All cans were in excellent condition with no skips, misses, double prints, etc. Compared to production (tinplate cans cleaned with a cleaner similar to "C," dried, and decorated as above), the cans coated with the compositions of this example were better appearing (white ink had more "depth") and there were no marred areas. All of the formulations were broadly receptive to conventional can printing inks and techniques.

Two cans from each group, as well as two of the regular production cans were subjected to the Adhesion Test as earlier described, with these results (exterior only):

| Treatment | Rating |
|---|---|
| Control | 8, 8–9 |
| 4A | 8–9, 8–9 |
| 4B | 8–9, 8–9 |
| 4C | 9 , 9 |

The adhesion of the printing inks to the cans coated with the formulations of this example was as good or better than the controls.

What is claimed is:

1. A process for coating a ferrous or tin surface comprising contacting the surface thereof with an aqueous composition comprising:
   (a) an epoxy resin having an average molecular weight of about 900 to 2,900 and about 2.7 to 11.6 hydroxyl equivalents per mole;
   (b) melamine-formaldehyde resin alkylated with at least one alcohol of from 1 to 4 carbon atoms in a weight ratio of epoxy resin:melamine-formaldehyde resin of from 2:1 to 20:1;
   (c) an acid catalyst which is an ammonium salt of an anion of the formula:

$$R-O-(CH_2CH_2O)_mSO_3^-$$

wherein R is an alkyl or alkylaryl group of at least 10 carbon atoms and containing a saturated alkyl portion and m is in the range of about 4 to 30 in an amount sufficient to effect cross linking of the epoxy resin and melamine-formaldehyde resin;
   (d) a block copolymer of general formula $$HO(CH_2CH_2O)_a(\underset{\underset{CH_3}{|}}{CH}CH_2O)_b(CH_2CH_2O)_cH$$

having an HLB in excess of 22 and a molecular weight in the range of about 5,000 to 14,000 in an amount of about 2 to 12 wt. % of the total of the epoxy and melamine-formaldehyde resin; and
   (e) water, the balance,
   wherein the total of the components (a), (b), (c) and (d) concentrations ranges from 5 to 85 wt. % of the aqueous composition and thereafter heat-curing the applied coating.

2. The process of claim 1 wherein the block copolymer has an HLB of at least about 29 and wherein the value of b is about 30 and the sum of a plus c is about 150.

3. The process of claim 1 wherein the total concentration of (a), (b), (c) and (d) is not in excess of about 60 wt. %.

4. The process of claim 3 wherein the total concentration of (a), (b), (c) and (d) is from about 12 to 40 wt. %.

5. The process of claim 1 wherein the aqueous composition exhibits pH value of from 4.5 to about 8½.

6. The process of claim 1 wherein the composition additionally contains a salt of phosphoric acid in an amount sufficient to increase the phase stability of the composition.

7. The process of claim 9 wherein the composition additionally contains benzoic acid or a salt thereof in an amount sufficient to inhibit rusting of the metal surface upon drying.

8. A ferrous or tin surface having thereon a coating obtained by the process of claim 1.

* * * * *